United States Patent
Jariwala et al.

(10) Patent No.: US 7,078,456 B2
(45) Date of Patent: Jul. 18, 2006

(54) FLUOROCHEMICAL OLIGOMERIC COMPOSITION AND USE THEREOF

(75) Inventors: Chetan P. Jariwala, Woodbury, MN (US); Dirk M. Coppens, Melsele (BE); Frank A. H. M. Godefroidt, Oudenaarde (BE)

(73) Assignee: 3M Innovative Properties Company, St. Paul, MN (US)

( * ) Notice: Subject to any disclaimer, the term of this patent is extended or adjusted under 35 U.S.C. 154(b) by 323 days.

(21) Appl. No.: 10/723,510

(22) Filed: Nov. 26, 2003

(65) Prior Publication Data

US 2005/0113508 A1    May 26, 2005

(51) Int. Cl.
*C08F 14/18* (2006.01)

(52) U.S. Cl. ............ 524/544; 524/556; 524/555; 524/560

(58) Field of Classification Search ........... 524/544, 524/556, 555, 560
See application file for complete search history.

(56) References Cited

U.S. PATENT DOCUMENTS

| | | | |
|---|---|---|---|
| 2,803,615 A | 8/1957 | Ahlbrecht et al. | |
| 2,841,573 A | 7/1958 | Ahlbrecht et al. | |
| 5,276,175 A * | 1/1994 | Dams et al. | 560/27 |
| 5,292,796 A | 3/1994 | Dams et al. | |
| 5,350,795 A | 9/1994 | Smith et al. | |
| 5,370,919 A | 12/1994 | Fieuws et al. | |
| 5,453,540 A | 9/1995 | Dams et al. | |
| 5,672,651 A | 9/1997 | Smith | |
| 5,714,082 A | 2/1998 | Boardman et al. | |
| 5,952,409 A | 9/1999 | Boardman et al. | |
| 6,174,964 B1 | 1/2001 | Jariwala et al. | |
| 6,193,791 B1 | 2/2001 | Vander Louw et al. | |
| 6,284,843 B1 | 9/2001 | Jariwala et al. | |
| 6,288,157 B1 | 9/2001 | Jariwala et al. | |
| 6,391,807 B1 | 5/2002 | Jariwala et al. | |
| 6,525,127 B1 | 2/2003 | Jariwala et al. | |

OTHER PUBLICATIONS

H, C. Fielding,; "Organofluorine Surfactants and Textile Chemicals", *Organofluorine Chemicals And Their Industrial Applications*, R. E. Banks, Ed., Society of Chemical Industry, 1979, Chapter 11, pp. 214-234.

* cited by examiner

*Primary Examiner*—David W. Wu
*Assistant Examiner*—Satya Sastri
(74) *Attorney, Agent, or Firm*—Kent S. Kokko

(57) ABSTRACT

A method of treating fibrous substrates by contacting the substrate with a fluorochemical composition comprising: a fluorochemical oligomeric component and an antisoiling component is described. The compositions provide desirable antisoiling properties, as well as oil, water and stain repellency to fibrous substrates.

26 Claims, No Drawings

FLUOROCHEMICAL OLIGOMERIC COMPOSITION AND USE THEREOF

FIELD OF THE INVENTION

This invention provides a method of treating substrates, particularly fibrous substrates, by contacting the substrate with a fluorochemical composition comprising: a fluorochemical oligomeric component and an antisoiling component. The compositions provide desirable antisoiling properties, as well as oil, water and stain repellency to substrates.

BACKGROUND

The utility of organofluorine compounds as surface-active agents (i.e., surfactants) and surface-treating agents is due in large part to the extremely low free-surface energy of a $C_6$–$C_{12}$ fluorocarbon group, according to H. C. Fielding, "Organofluorine Compounds and Their Applications," R. E. Banks, Ed., Society of Chemical Industry at p. 214 (1979). Generally, the organofluorine substances described above are those which have carbon-bonded fluorine in the form of a monovalent fluoroaliphatic radical such as a perfluoroalkyl group, typically —$C_nF_{2n+1}$, where n is at least 3, the terminal part of which group is trifluoromethyl, —$CF_3$.

U.S. Pat. No. 5,453,540 (Dams et al.) describes fluorochemical compositions for the treatment of textiles comprising: (i) a fluorochemical oligomeric portion comprising an aliphatic backbone with a plurality of fluoroaliphatic groups attached thereto, each fluoroaliphatic group having a fully fluorinated terminal group and each independently linked to a carbon atom of the aliphatic backbone through an organic linking group;(ii) an organic moiety (which can be functional or non-functional, and which is different from the fluorochemical oligomeric portion); (iii) a non-polymeric isocyanate-derived linking group which links the fluorochemical oligomeric portion to the organic moiety; and (iv) a group bonded thereto, which can impart soft hand, stain release, water repellency, or a durable property when the compound is applied to a fibrous substrate.

Despite the various publications there continues to be a need for further fluorochemical compositions for the treatment of fibrous substrates to impart desired properties thereto such as water repellency, water-proofness, oil repellency and stain resistance. Yet further, although fluorochemical compositions have been employed for this purpose, the compositions have provided little or no antisoiling properties without degradation of the repellency properties. Thus it is desirable to provide a composition that can provide both durable repellency and antisoiling properties to fibrous substrates. It is further desired that such fluorochemical compositions be readily produced in a cost effective way, have sufficient storage stability and are efficient even if applied in low quantities to the substrate.

SUMMARY OF THE INVENTION

This invention provides a composition for treating substrates, particularly fibrous substrates, to render the substrates durably resistant to dry soil and durably repellent to water and oil. The composition comprises a) a fluorochemical oligomeric component and b) an antisoiling component. The fluorochemical oligomeric component comprises one or more pendent aliphatic groups having 12 to 75 carbon atoms. The aliphatic group may be pendant from the fluorochemical oligomer or the residue of a polyisocyanate. The antisoiling component improves the resistance of treated substrates to dry soil, but surprisingly does not reduce the oil- and/or water repellency. Typical anti-soiling agents include, for example, methacrylic ester polymers, colloidal alumina, colloidal silica, silsesquioxanes, polyvinylpyrrolidone, and water-soluble condensation polymers.

In another aspect, the invention provides a method of treating fibrous substrates comprising contacting the fibrous substrate with a treatment composition comprising a) the fluorochemical oligomeric component, b) an antisoiling component (as further described herein) and may comprise a solution, dispersion or suspension in a solvent. In another aspect, the present invention provides a treated substrate comprising a coating of the treatment composition on at least a portion of the substrate. The treatment composition can be applied in the form of an aqueous dispersion or emulsion, or as a solution thereof in an organic solvent. The aqueous dispersions are preferred for environmental reasons.

DETAILED DESCRIPTION

The treatment composition comprises a fluorochemical oligomeric component and an antisoiling component. The fluorochemical oligomeric component contains a plurality of pendant fluoroaliphatic groups proximal to one another (e.g., located on alternating carbon atoms of an aliphatic backbone, or occasionally on adjacent carbon atoms), as distinct from isolated fluoroaliphatic groups randomly distributed throughout the compound and also as distinct from fluoroaliphatic groups uniformly located on adjacent carbon atoms.

In one embodiment, the fluorochemical oligomeric component comprises:

(i) the residue of an isocyanate, which may be a mono- or polyisocyanate,
(ii) a fluorochemical oligomeric portion comprising an aliphatic backbone with a plurality of pendant fluoroaliphatic groups and optionally non-fluorinated aliphatic groups, each fluoroaliphatic group having a fully fluorinated terminal group and each independently linked to a carbon atom of the aliphatic backbone through an organic linking group;
(iii) an aliphatic moiety of 12 to 75 carbon atoms; and
(iv) isocyanate-derived linking groups which links the fluorochemical oligomeric portion to the residue of the isocyanate.

In one embodiment, the isocyanate is a monoisocyanate and the aliphatic moiety of 12 to 75 carbon atoms may comprise one or more of the non-fluorinated aliphatic groups, linked to a carbon atom of the aliphatic backbone of said fluorochemical oligomeric potion. In another embodiment, the isocyanate is a polyisocyanate, and the aliphatic moiety of 12 to 75 carbon atoms may be linked to the residue of the polyisocyanate through an isocyanate-derived linking group.

The fluorochemical oligomeric component may comprise the reaction product of:

i) a polyisocyanate,
ii) a fluorochemical oligomeric compound comprising an aliphatic backbone with a plurality of pendant fluoroaliphatic groups, optionally a plurality of non-fluorinated aliphatic groups, each fluoroaliphatic group having a filly fluorinated terminal group and each independently linked to a carbon atom of the aliphatic backbone through an organic linking group, and an isocyanate-reactive terminal group; and iii) an aliphatic compound having an isocyanate-reactive group
iv) wherein at least one of said non-fluorinated aliphatic groups or said aliphatic compound has 12 to 75 carbon atoms.

In another embodiment, the fluorochemical oligomeric component may comprise the reaction product of;
v) an isocyanate, which is preferably a monoisocyanate
vi) a fluorochemical oligomeric compound comprising an aliphatic backbone with a plurality of pendant fluoroaliphatic groups, and a plurality of non-fluorinated aliphatic groups of 12 to 75 carbon atoms, each fluoroaliphatic group having a fully fluorinated terminal group and each independently linked to a carbon atom of the aliphatic backbone through an organic linking group, and an isocyanate-reactive terminal group.

In one embodiment, the fluorochemical oligomeric component comprises compounds of the formula:

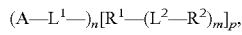  (Formula I), wherein
A is a fluorochemical oligomer of the formula:

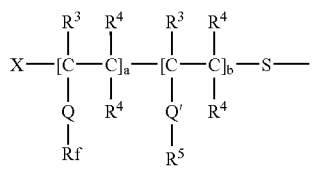

wherein
the sum of a+b is an number such that the compound is oligomeric and a is at least 1;
each $R^3$ is independently a hydrogen, halogen, or straight chain or branched chain alkyl containing 1 to about 4 carbon atoms;
each $R^4$ is independently hydrogen or straight chain or branched chain alkyl containing 1 to about 4 carbon atoms;
Q and Q' are each independently a covalent bond or divalent linking group,
$R_f$ is a fluoroaliphatic group that comprises a fully fluorinated terminal group;
$R^5$ is a non-fluorinated aliphatic group;
X is a hydrogen atom or a group derived from a free radical initiator;
$L^1$ and $L^2$ are independently isocyanate-derived linking groups,
$R^1$ is the residue of an organic isocyanate,
$R^2$ is a hydrogen or an aliphatic group,
n is 1 to 4, m is 0 to 4, p is 1 to 4 and wherein at least one of said $R^2$ and $R^5$ groups has 12 or more carbon atoms.

With reference to Formula I, it will be understood that one or more fluorochemical oligomeric moieties (shown as A—$L^1$—) may be bonded to the residue of an isocyanate, (shown as $R^1$), where the number of oligomeric moieties is n. Conversely, there may be one or more residues of an isocyanate (shown as —$R^1$—($L^2$—$R^2$) bonded to the oligomeric moiety, where the number of residues is p. Further, one of more aliphatic groups (shown as $R^2$) may also be bonded to the residue of the isocyanate, where the number is m.

With reference to Formulas I and II, at least one of the $R^2$ or $R^5$ groups comprises an aliphatic group of 12 to 75 carbon atoms. With further reference to Formula II, it will be understood that the fluorochemical oligomeric moiety may have a random distribution of fluorinated and fluorine-free segments, or a sequential arrangement where the oligomer comprises "blocks" of fluorinated and fluorine-free segments, i.e. a block oligomeric copolymer. Further it will be understood that the relative position of the units derived from fluorinated monomers and fluorine-free monomers may vary with respect to the X and S moieties. In essence the following structures are both within the scope of the invention:

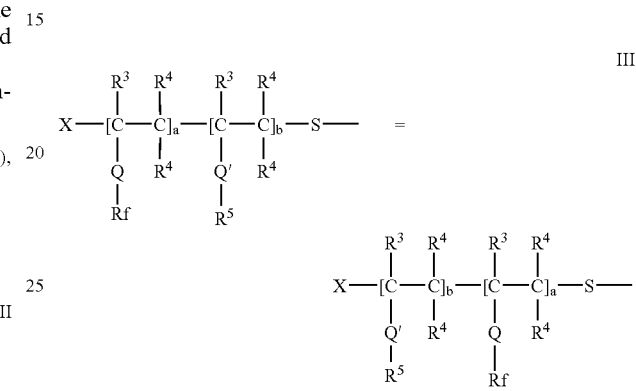

The fluorochemical oligomeric moiety of Formulas II and III generally comprise mixtures of alkylated fluorochemical oligomers. Accordingly, compounds are sometimes referred to herein as having non-integral numbers of particular substituents (e.g., "a=2.7"). In such cases the number indicates an average and is not intended to denote fractional incorporation of a substituent. The terms "oligomer" or "oligomeric" when used herein designate compounds containing a plurality of polymerized units, but fewer than that number of polymerized units present in a polymer (e.g., chains of 3 to about 20 polymerized units are to be considered "oligomeric"). Preferably, the oligomeric portion contains 3 to 10 polymerized units, and more preferably 3 to 7 polymerized units. Further, the ratio of fluorinated to non-fluorinated pendent groups ($R_f$ to $R^5$ groups) is preferably 2:1 or greater.

As described above and further illustrated in Formulas I and II, a fluorochemical composition useful in the invention comprises an fluorochemical oligomeric component that generally has three principal portions: a fluorochemical oligomeric portion "A", a moiety derived from an isocyanate "$R^1$" (which may be a mono- or polyisocyanate) and an aliphatic moiety "$R^2$ and/or $R^5$", where at least one of $R^2$ and $R^5$ have 12 to 75 carbons atoms The fluorochemical oligomeric portion and the aliphatic moiety are linked to the polyisocyanate residue by linking groups $L^1$ and $L^2$, respectively. The linking groups are derived from a reaction between a an isocyanate-reactive group, such as an alcohol, an amine, or a thiol, and an isocyanate group of a mono- or polyisocyanate As used in the instant specification and claims, the terms "isocyanate-derived" and "isocyanate derivative" designate compounds or groups that are capable of being prepared by a known reaction of an isocyanate. The term isocyanate reactive groups refer to those functional groups that react with an isocyanate by condensation reaction, for example a reactive group such as a hydroxyl will react with an isocyanate group to form a urethane link.

While such compounds or groups are preferably prepared from isocyanates, these terms are not intended to require that an isocyanate actually be used in their preparation. For example, blocked isocyanates may be used. Isocyanate-derived linking groups are referred to herein using a nomenclature system analogous to that from which the term "ureylene" arises with respect to urea-containing compounds. Accordingly, a linking group with the structure of a biuret will be referred to as "biuretylene"; guanidine: "guanidinylene"; carbodiimide: "carbodiimidylene", and so forth. "Non-polymeric" when used to define an isocyanate-derived linking group designates a linking group in which the isocyanate-derived moiety is not a repeating unit in a polymeric chain (e.g., the linking group is not a polyamide or a polyurethane).

A salient component of the fluorochemical oligomeric portion is the fluoroaliphatic group, designated herein as $R_f$. The fluorinated compound of the invention contains a plurality of pendent $R_f$ groups (e.g., from 2 to about 10) proximal to one another and preferably contains from about 5 percent to about 80 percent, more preferably from about 20 percent to about 65 percent, and most preferably about 25 percent to about 55 percent fluorine by weight, based on the total weight of the compound, the loci of the fluorine being essentially in the $R_f$ groups. $R_f$ is a stable, inert, non-polar, preferably saturated, monovalent moiety which is both oleophobic and hydrophobic. $R_f$ preferably contains at least about 3 carbon atoms, more preferably 3 to about 20 carbon atoms, and most preferably about 3 to about 7 carbon atoms. $R_f$ can contain straight chain, branched chain, or cyclic fluorinated alkylene groups or combinations thereof with straight chain, branched chain, or cyclic alkylene groups. $R_f$ is preferably free of polymerizable olefinic unsaturation and can optionally contain catenary heteroatoms such as divalent oxygen, or trivalent nitrogen. It is preferred that $R_f$ contain about 35% to about 78% fluorine by weight, more preferably about 40% to about 78% fluorine by weight. The terminal portion of the $R_f$ group contains a fully fluorinated terminal group. This terminal group preferably contains at least 7 fluorine atoms, e.g., $CF_3CF_2CF_2$—, $(CF_3)_2CF$—, or the like. Perfluorinated aliphatic groups (i.e., those of the formula $C_oF_{2o+1}$, where o is 3 to 7) are the most preferred embodiments of $R_f$.

The fluoroaliphatic group $R_f$ and the aliphatic group $R^5$ are each linked to the organic portion (i.e. the oligomeric backbone or the unsaturated portion of the monomer) by a linking groups designated as Q and Q' respectively in the Formula II used herein. Q and Q' are independently linking groups that may be a covalent bond, divalent alkylene, or a group that can result from the condensation reaction of a nucleophile such as an alcohol, an amine, or a thiol with and electrophile, such as an ester, acid halide, isocyanate, sulfonyl halide, sulfonyl ester, or may result from a displacement reaction between a nucleophile and leaving group. Each Q and Q' is are independently chosen, preferably contains from 1 to about 20 carbon atoms and can optionally contain catenary oxygen, nitrogen, sulfur, or silicon-containing groups or a combination thereof. Q and Q' is preferably free of functional groups that substantially interfere with free-radical oligomerization (e.g., polymerizable olefinic double bonds, thiols, easily abstracted hydrogen atoms such as cumyl hydrogens, and other such functionality known to those skilled in the art). Examples of suitable linking groups Q and Q' include straight chain, branched chain, or cyclic alkylene, arylene, aralkylene; oxy, oxo, hydroxy, thio, sulfonyl, sulfoxy, amino, imino, sulfonamido, carboxamido, carbonyloxy, urethanylene, urylene, and combinations thereof such as sulfonamidoalkylene. Preferably linking group Q is a covalent bond or a sulfonamidoalkylene group. Preferably linking group Q' is a covalent bond.

Suitable linking groups Q and Q' include the following structures in addition to a covalent bond. For the purposes of this list, each k is independently an integer from 0 to about 20, $R_1'$ is hydrogen, aryl, or alkyl of 1 to about 4 carbon atoms, and $R_2'$ is alkyl of 1 to about 20 carbon atoms. Each structure is non-directional, i.e. $-(CH_2)_kC(O)O-$ is equivalent to $-O(O)C(CH_2)_k-$.

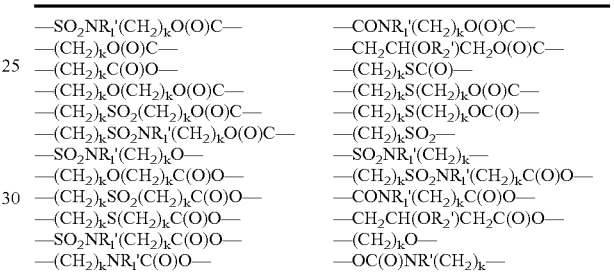

The organic aliphatic moiety, designated $R^2$ in compounds of Formula I, is a preferably monovalent, linear or branched chain, saturated or unsaturated, cyclic or acyclic (or any combination thereof) organic aliphatic group having from 1 to 75 carbon atoms. In certain embodiments $R^2$ may be fluorinated (i.e. $R^2$ may be defined as $R_f$). Preferably $R^2$ has 12 to 75 carbon atoms. The range of structures contemplated for the organic moiety $R^2$ will be better understood with reference to the compounds suitable for use in steps of the Reaction Schemes described in detail below. Preferably $R^2$ is a monovalent alkyl group having from 12 to 75 carbon atoms, preferably 16 to 60 carbon atoms. Where more than one $R^2$ group is present, such as when m is greater than one in Formula I, the sum of the carbon atoms in the $R^2$ groups is preferably from 18 to 100 carbon atoms.

The moiety designated as $R^2$ in Formula I is derived from an isocyanate-reactive compound of the formula $R^2—(Z)_q$, where Z is an isocyanate reactive group and q is 1 to 4, preferably 1. As previously described, $R^2$ is a mono- or polyvalent, linear or branched chain, saturated or unsaturated, cyclic or acyclic (or any combination thereof) organic aliphatic group having from 1 to 75 carbon atoms and Z is an isocyanate-reactive functional group such as an amino group, a hydroxy group, or a carboxyl group. In certain embodiments $R^2$ may be fluorinated (i.e. $R^2=R_f$). Preferably $R^2$ has 12 to 75 carbon atoms. More preferably $R^2$ is a monovalent alkyl group having from 12 to 75 carbon atoms. Where more than one $R^2$ group is present, such as when m is greater than one in Formula I, the sum of the carbon atoms in the $R^2$ groups is preferably from 12 to 100 carbon atoms.

Further, where more than one functional group Z is present (q>1), multiple groups of the formula $(A-L^1-)_n-R^1-L^2-$ will be connected with one $R^2$ group.

The moiety designated as $R^1$ in Formula I is derived from an isocyanate, including mono- or polyisocyanate. Isocyanate compounds useful in preparing the fluorochemical oligomers of the present invention comprise isocyanate radicals attached to the mono or polyvalent organic group that can comprise a multivalent aliphatic, alicyclic, or aromatic moiety; or an aliphatic, alicyclic or aromatic moiety attached to a biuret, an isocyanurate, or a uretdione, or mixtures thereof. Preferred polyfunctional isocyanate compounds contain an average of two to six isocyanate (—NCO) radicals. Compounds containing two —NCO radicals are preferably comprised of divalent aliphatic, alicyclic, araliphatic, or aromatic groups to which the —NCO radicals are attached.

Representative examples of suitable isocyanate compounds include isocyanate functional derivatives of the isocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, araliphatic, or aromatic polyisocyanate, may be used either singly or in mixtures of two or more. The aliphatic polyisocyanate compounds generally provide better light stability than the aromatic compounds. Aromatic polyisocyanate compounds, on the other hand, are generally more economical and reactive toward polyols than are aliphatic polyisocyanate compounds. Suitable aromatic polyisocyanate compounds include, but are not limited to, those selected from the group consisting of 2,4-toluene diisocyanate (TDI), 2,6-toluene diisocyanate, an adduct of TDI with trimethylolpropane (available as Desmodur™ CB from Bayer Corporation, Pittsburgh, Pa.), the isocyanurate trimer of TDI (available as Desmodur™ IL from Bayer Corporation, Pittsburgh, Pa.), diphenylmethane 4,4'-diisocyanate (MDI), diphenylmethane 2,4'-diisocyanate, 1,5-diisocyanato-naphthalene, 1,4-phenylene diisocyanate, 1,3-phenylene diisocyanate, 1-methyoxy-2,4-phenylene diisocyanate, 1-chlorophenyl-2,4-diisocyanate, and mixtures thereof.

Examples of useful alicyclic polyisocyanate compounds include, but are not limited to, those selected from the group consisting of dicyclohexylmethane diisocyanate ($H_{12}MDI$, commercially available as Desmodur™ W, available from Bayer Corporation, Pittsburgh, Pa.), 4,4'-isopropyl-bis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), dimmer acid diisocyanate (available from Bayer),1,3-bis(isocyanatomethyl)cyclohexane ($H_6XDD$), 3-isocyanatomethyl-3,5,5-trimethylcyclohexyl isocyanate, and mixtures thereof.

Examples of useful aliphatic polyfunctional isocyanate compounds include, but are not limited to, those selected from the group consisting of tetramethylene 1,4-diisocyanate, hexamethylene 1,4-diisocyanate, hexaamethylene 1,6-diisocyanate (HDI), octamethylene 1,8-diisocyanate, 1,12-diisocyanatododecane, 2,2,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (Desmodur™ N-100 and N-3200 from Bayer Corporation, Pittsburgh, Pa.), the isocyanurate of HDI (available as Desmodur™ N-3300 and Desmodur™ N-3600 from Bayer Corporation, Pittsburgh, Pa.), a blend of the isocyanurate of HDI and the uretdione of HDI (available as Desmodure™ N-3400 available from Bayer Corporation, Pittsburgh, Pa.), and mixtures thereof.

Examples of useful araliphatic polyisocyanates include, but are not limited to, those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, p-(1-isocyanatoethyl)phenyl isocyanate, m-(3-isocyanatobutyl) phenyl isocyanate, 4-(2-isocyanatocyclohexyl-methyl) phenyl isocyanate, and mixtures thereof.

Useful monoisocyanates include octadecyl isocyanate, butyl isocyanate, hexyl isocyanate, phenyl isocyanate, benzyl isocyanate, naphthyl isocyanate, and the like.

Preferred polyisocyanates, in general, include those selected from the group consisting of the biuret of hexamethylene 1,6-diisocyanate, tetramethylene 1,4-diisocyanate, hexamethylene 1,4-diisocyanate, hexamethylene 1,6-diisocyanate (HDI), octamethylene 1,8-diisocyanate, 1,12- diisocyanatododecane, octadecylisocyanate, and the like, and mixtures thereof.

X, of Formula I, is a group derived from a free-radical initiator. As used herein, the term "free-radical initiator" designates any of the conventional compounds such as organic azo compounds, organic peroxides (e.g., diacyl peroxides, peroxyesters, dialkyl peroxides) and the like that provide initiating radicals upon homolysis. As used herein, the term "group derived from a free-radical initiator" designates an initiating radical formed upon homolytic decomposition of a free-radical initiator.

Suitable groups X include non-reactive groups such as a hydrogen atom, t-butoxy (derived from di-t-butylperoxide), and benzoyloxy (derived from benzoyl peroxide), and reactive groups such as ——$CCH_3(CN)CH_2CH_2CO_2H$ (derived from azo-4-cyanoisovaleric acid), ——$C(CH_3)_2CN$ (derived from azoisobutyronitrile), and those derived from other known functional azo compounds such as 2,2'-azobis[N-(4-chlorophenyl)-2-methylpropionamidine]-dihydrochloride; 2,2'-azobis[N-(4-hydroxyphenyl)-2-methylpropionamidine]dihydrochloride; 2,2,-azobis[N-(4-aminophenyl)-2-methylpropionamidine]-tetrahydrochloride; 2,2'-azobis[2-methyl-N-2-propenylpropionamidine]dihydrochloride; 2,2'-azobis[N-(2-hydroxyethyl)-2-methylpropionamidine]-dihydrochloride; 2,2'-azobis[2-methyl-N-(2-hydroxyethyl)-propionamide]; 2,2'-azobis[2-(hydroxymethyl)propionitrile]; 2,2'-azobis[2-methyl-N-[1,1-bis(hydroxymethyl)-2-hydroxyethyl]propionamide]; and 2,2'-azobis {2-methyl-N-[1,1-bis(hydroxymethyl)ethyl]-propionamide}. Preferred groups X include those enumerated above.

The fluorochemical oligomeric compounds corresponding to the fluorochemical oligomeric moiety of Formula II can be prepared by oligomerization of an unsaturated compound having a fluorinated aliphatic pendent group (IV) and an unsaturated compound having a fluorine-free aliphatic pendent group (V) in the presence of a free-radical initiator and chain-transfer agent of the formula $(Z)_q-L^1-SH$ according to the following Scheme:

Scheme 1

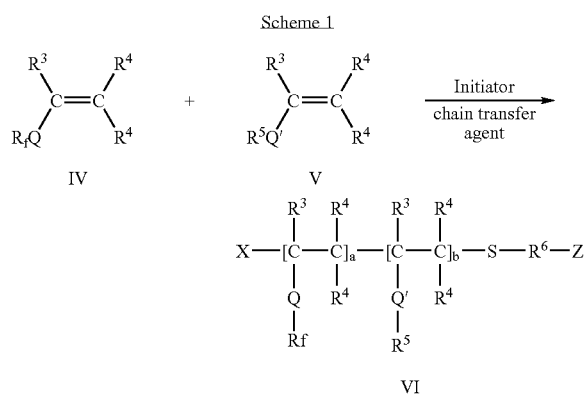

VI

The moiety "$R^6$—Z" corresponds to the linking group moiety $L^1$ of Formula II, wherein $R^6$ is an aliphatic or aromatic organic group having 1 to 20 carbons Compounds of Formula (IV) and methods for the preparation thereof are known and disclosed, e.g., in U.S. Pat. No. 2,803,615 (Ahlbrecht et al.) and U.S. Pat. No. 2,841,573 (Ahlbrecht et al.) which disclosures are incorporated herein by reference. Examples of such compounds include general classes of fluorochemical monomers such as acrylates, methacrylates, vinyl ethers, and allyl compounds containing fluorinated sulfonamido groups, acrylates or methacrylates derived from fluorochemical telomer alcohols, fluorochemical thiols, and the like. Preferred compounds of Formula IV include N-methyl perfluorobutanesulfonamidoethyl acrylate, N-methyl perfluorooctanesulfonamidoethyl methacrylate, N-ethyl perfluorooctanesulfonamidoethyl acrylate, N-ethyl perfluorohexylsulfonamidoethyl methacrylate, the reaction product of isocyanatoethyl methacrylate and N-methylperfluorooctanesulfonamidoethyl alcohol, 1,1-dihydroperfluorooctyl acrylate, N-methyl perfluorooctanesulfonamidoethyl vinyl ether, $C_4F_9SO_2NHCH_2CH=CH_2$, and others such as perfluorocyclohexyl acrylate (c-$C_6F_{11}CH_2OCOCH=CH_2$), and tetrameric hexafluoropropyleneoxide dihydroacrylate.

Compounds of Formula V may be selected from alkyl acrylate esters, vinyl acetate, styrene, alkyl vinyl ethers, alkyl methacrylate esters, acrylic acid, methacrylic acid, acrylamide, methacrylamide, acrylonitrile, methacrylonitrile, and N-vinylpyrrolidone. Alkyl acrylate ester monomers useful in the invention include straight-chain, cyclic, and branched-chain isomers of alkyl esters containing $C_1$–$C_{50}$ alkyl groups. Useful specific examples of alkyl acrylate esters include: methyl acrylate, ethyl acrylate, n-propyl acrylate, 2-butyl acrylate, iso-amyl acrylate, n-hexyl acrylate, heptyl acrylate, n-octyl acrylate, iso-octyl acrylate, 2-ethylhexyl acrylate, nonyl acrylate, decyl acrylate, undecyl acrylate, dodecyl acrylate, tridecyl acrylate, octadecylacryalate and octadecylmethacrylate and tetradecyl acrylate.

The chain transfer agent is of the formula $(Z)_q$—$R^6$—SH having a functional group Z that may be reacted with an isocyanate group of a mono- or polyisocyanate (designated as $R^1$) and an aliphatic or aromatic divalent organic group to form the linking group $L^1$ and subsequently incorporate the $R^2$ group (the aliphatic group) into the compounds of Formula I. The number of functional groups, designated as "q" may be 1 to 4, and is preferably 1. The functional group Z is chosen to be isocyanate-reactive. Examples include a hydroxy, amino, or carboxyl group.

A compound of Formulas VI may be provided with functional groups, Z, on the $L^1$ linking group (in addition to the sulfhydryl group(s)) through the use of an appropriate functionalized chain-transfer agent $(Z)_q$—$R^6$—SH (multiple Z groups have been omitted for clarity) Suitable functional groups for inclusion in the chain-transfer agent include isocyanate-reactive functional groups such as hydroxy, amino, acid groups and salts thereof, which react with an isocyanate, or are capable of further transformation into such groups. The use of a functionalized chain-transfer agent allows for subsequent incorporation of the "$R^2$" group of Formulas I Examples of such functionalized chain transfer agents include 2-mercaptoethanol, mercaptoacetic acid, 2-mercaptobenzimidazole, 2-mercaptobenzoic acid, 2-mercaptobenzothiazole, 2-mercaptobenzoxazole, 3-mercapto-2-butanol, 2-mercaptosulfonic acid, 2-mercaptonicotinic acid, 4-hydroxythiopheno3-mercapto-1,2-propanediol, 1-mercapto-2-propanol, 2-mercaptopropionic acid, N-(2-mercaptopropionyl)glycine, 2-mercaptopyridine, 2-mercaptopyridine-N-oxide, 2-mercaptopyridinol, mercaptosuccinic acid, 2,3-mercaptopropanesulfonic acid, 2,3-dimercaptopropanol, 2,3-dimercaptosuccinic acid, cystine, and cystine hydrochloride,. Preferred functionalized chain-transfer agents include 2-mercaptoethanol, 3-mercapto-1,2-propanediol, 4-mercaptobutanol, 11-mercaptoundecanol, mercaptoacetic acid, 3-mercaptopropionic acid, 12-mercaptododecanoic acid, 2-mercaptoethylamine, 1-chloro-6-mercapto-4-oxahexan-2-ol, 2,3-dimercaptosuccinic acid, 2,3-dimercaptopropanol, 3-mercaptopropyltrimethoxysilane, 2-chloroethanethiol, 2-amino-3-mercaptopropionic acid, and compounds such as the adduct of 2-mercaptoethylamine and caprolactam.

As can be seen with reference to Formula I, chain transfer agents having multiple isocyanate-reactive functions groups "Z", such as 3-mercapto-1,2-propanediol, may be used to prepare compounds having multiple isocyanate residues $R^1$—($L^2$—$R^2$) connected to a single oligomeric moiety. Further, chain transfer agent having multiple sulfhydryl group, such as 2,3-dimercaptopropanol may be used to provide compounds having multiple oligomeric moieties connect to a single isocyanate residue.

The functionalized chain transfer agent is present in an amount sufficient to control the number of polymerized monomer units in the oligomer. The chain transfer agent is generally used in an amount of about 0.05 to about 0.5 equivalents, preferably about 0.25 equivalents, per equivalent of olefinic monomers IV and/or V.

Also present in is the preparation of the oligomeric compound VI is a free-radical initiator as defined above in connection with X. Such compounds are known to those skilled in the art and include persulfates, azo compounds such as azoisobutyronitrile and azo-2-cyanovaleric acid and the like, hydroperoxides such as cumene, t-butyl, and t-amyl hydroperoxide, dialkyl peroxides such as di-t-butyl and dicumyl peroxide, peroxyesters such as t-butyl perbenzoate and di-t-butylperoxy phthalate, diacylperoxides such as benzoyl peroxide and lauroyl peroxide.

The initiating radical formed by an initiator can be incorporated into the fluorochemical oligomer to varying degrees depending on the type and amount of initiator used. A suitable amount of initiator depends on the particular initiator and other reactants being used. About 0.1 percent to about 5 percent, preferably about 0.1 percent, to about 0.8 percent, and most preferably about 0.2 percent to 0.5 percent by weight of an initiator can be used, based on the total weight of all other reactants in the reaction.

The oligomerization reaction of Scheme 1 can be carried out in any solvent suitable for organic free-radical reactions. The reactants can be present in the solvent at any suitable concentration, e.g., from about 5 percent to about 90 percent by weight based on the total weight of the reaction mixture. Examples of suitable solvents include aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), alcohols (e.g., ethanol, isopropyl alcohol), ketones (e.g., acetone, methyl ethyl ketone, methyl isobutyl ketone), sulfoxides (e.g., dimethyl sulfoxide), amides (e.g., N,N-dimethylformamide, N,N-dimethylacetamide), halogenated solvents such as methylchloroform, FREON™ 113, trichloroethylene, $\alpha,\alpha,\alpha$-trifluorotoluene, fluorinated ethers such as $C_4F_9OCH_3$ and the like, and mixtures thereof.

The oligomerization can be carried out at any temperature suitable for conducting an organic free-radical reaction. Particular temperature and solvents for use can be easily selected by those skilled in the art based on considerations such as the solubility of reagents, the temperature required for the use of a particular initiator, and the like. While it is not practical to enumerate a particular temperature suitable for all initiators and all solvents, generally suitable temperatures are between about 30° C. and about 200° C.

The fluorochemical oligomeric component of Formula I may be prepared by reacting a polyisocyanate, the fluorochemical oligomeric compound of Formula VI having an isocyanate-reactive terminal group; and an aliphatic compound having an isocyanate-reactive group ($R^2$—$(Z)_q$). The three reactive components may be combined to form the reaction products, or the polyisocyanate may first be reacted with the oligomeric compound, followed by the aliphatic compound, or may be reacted first with the aliphatic compound, followed by the oligomeric compound. Compounds of Formula I may also be prepared by reacting a monoisocyanate, and the fluorochemical oligomeric compound of Formula VI having an isocyanate-reactive terminal group, provided that the fluorochemical oligomeric compound of Formula VI, has a pendent aliphatic group ($R^5$) of 12 to 75 carbon atoms.

The molar ratio of fluorochemical oligomeric compound of Formula VI to polyisocyanate is generally from 10 to 95% of the available isocyanate groups, with the balance of the isocyanate groups reacted with the aliphatic compound. Preferably, the ratio of the fluorochemical oligomeric compound of Formula VI to polyisocyanate is less than 75% of the available isocyanate groups. Above this amount the repellency performance does not appreciably improve and the cost is higher. Where $R^5$ comprises an aliphatic moiety of 12 to 75 carbon atoms, such as where "m" of Formula II is zero, essentially all of the available isocyanate groups may be reacted with fluorochemical oligomeric compound of Formula VI.

It will be understood that a mixture of fluorochemical oligomeric compounds will result, which is generally a statistical mixture of substitution products on the polyisocyanate. Any remaining isocyanate groups may be reacted or hydrolyzed as desired. In some embodiments it may be desirable to leave some small percentage of the available isocyanate groups unreacted, generally less than 10%, and hydrolyze the remaining. In the presence of a small amount of water, the unreacted isocyanates will react to form urea links between isocyanate residues.

Depending on reaction conditions (e.g., reaction temperature and/or polyisocyanate used), a catalyst level of up to about 0.5 percent by weight of the total weight of the reactant mixture may be used, but typically about 0.00005 to about 0.5 percent by weight is required, 0.02 to 0.1 percent by weight being preferred.

Suitable catalysts include, but are not limited to, tertiary amine and tin compounds. Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co., Milwaukee, Wis.), and 1,8-diazabicyclo[5.4.0.]undec-7-ene (DBU, Aldrich Chemical Co., Milwaukee, Wis.). Tin compounds are preferred. If an acid catalyst is used, it may be removed from the oligomer or neutralized after the oligomerization.

Generally, the amount of the fluorochemical oligomeric component a) to the antisoiling component b) is from 1:20 to 20:1. Preferably, the ratio is from 4:1 to 1:4, and most preferably from 2:1 to 1:2.

The antisoiling agents, component b), are defined as those materials which are solid, non-tacky water soluble or water dispersible and which upon drying of the composition are capable of rendering the substrate non-tacky and resistant to soiling. Also mixtures of the anti-soiling agent can be used.

Useful anti-soiling agents include colloidal alumina (e.g., CATAPAL and DISPAL aluminas available from Vista Chemical company) and colloidal silica (e.g. NALCO silicas available from Nalco Chemical Company), brittle polymeric resins such as styrene-acrylic acid copolymers, styrene-maleic anhydride copolymers (e.g., SMA Resins available from Atochem), polyvinylpyrrolidone polyacrylate/acrylic acid copolymers (e.g., RHOPLEX resins available from Rohm and Haas), vinyl acetate/maleic anhydride copolymers (e.g., VAMA resins available from Monsanto), carboxymethylcellulose, carboxyl-containing resins (e.g., CARBOSET resins from B.F. Goodrich), methacrylic ester polymers such as ethyl methacrylate/methyl methacrylate copolymers; and water soluble melamine/formaldehyde condensates.

A preferred class of antisoiling polymers are water-insoluble addition polymers derived from a polymerizable ethylenically unsaturated monomer free of non-vinylic fluorine, the polymer having at least one major transition temperature higher than about 25° C., preferably at above 40° C., more preferably above 45° C.

More specifically, the addition polymer is characterized as being normally non-rubbery (or curable to a non-rubbery state), non-tacky, normally solid, water-insoluble, and preferably free of ethylenic or acetylenic unsaturation. Water-insolubility is required to provide durability to the normal cleaning operations such as shampooing. In order to be resistant to soil under high compressive load, especially particulate soil, the addition polymer must have at least one major transition temperature above about 45° C. which is a melting point or glass transition in which the polymer becomes significantly softer as the temperature is raised. Transitions are characteristically glass temperature (Tg) or crystalline melting points (Tm), such as are usually detected by DTA (differential thermal analysis) or thermomechanical analysis (TMA). While suitable materials may have, for example, glass transitions at relatively low temperatures such as −25° to 0° C., the polymer must have at least one major transition point above about 25° C.

The addition polymers may be prepared from suitable monomers such as vinyl chloride, vinylidene chloride, styrene, alpha-methyl styrene, lower alkyl (meth)acrylates, and glycidyl acrylate and methacrylate. Such monomers can be polymerized or copolymerized with each other or with minor amounts, e.g., 0.5 to 45% of additional monomers to provide or improve particular desired physical or chemical properties, e.g., flexibility, substantivity, surface conductivity, etc. Representative of such additional monomers are vinyl acetate, vinyl pyridine, alkyl acrylates or methacrylates hydroxy lower alkyl acrylates and methacrylates, acrylamide and methacrylamide, N-methylol acrylamide, itaconic acid and maleic anhydride. The amounts of such additional monomer used must, of course, not be so great as to impart water solubility to the addition polymer. Also, at least one major transition temperature of the addition polymer must remain above about 25° C. A most preferred polymeric antisoiling component is ethyl methacrylate/methyl methacylate copolymers.

Another useful class of anti-soiling agents are styrene/maleic anhydride copolymer salts which preferably have a ratio of styrene to maleic anhydride of about 1:1 to 1:5, preferably about 1:3, an acid number of about 150 to 500, preferably about 275 and a number average molecular weight of about 1000 to 3000, preferably about 2000. The styrene/maleic anhydride copolymer salt can be an ammonium, sodium, potassium or any monovalent salt. The ammonium salt is generally preferred. The styrene/maleic anhydride copolymer are commercially available, for example, from Atochem as SMA™-resins.

The fluorochemical treatment compositions comprise aqueous suspensions, emulsions, or solutions, or organic solvent (or organic solvent/water) solutions, suspensions, or emulsions of the fluorochemical oligomeric components (component a), and the antisoiling agent (component b) of the present invention. When applied as coatings, the fluorochemical compositions of the present invention impart oil- and water-repellency properties, and/or stain-release and stain-resistance characteristics to any of a wide variety of substrates.

The treatment composition can be dissolved, suspended, or dispersed in a variety of solvents to form coating compositions suitable for use in coating onto a substrate. Generally, the solvent solutions can contain from about 0.1 to about 50 percent, or even up to about 90 percent, by weight non-volatile solids (based on the total weight of the components). Aqueous suspensions, emulsions, or solutions are generally preferred and generally can contain a non-volatile solids content of about 0.1 to about 50 percent, preferably, about 1 to about 40 percent, by weight (based on the total weight of the components). Suitable solvents include water, alcohols, esters, glycol ethers, amides, ketones, hydrocarbons, hydrofluorocarbons, hydrofluoroethers, chlorohydrocarbons, chlorocarbons, and mixtures thereof. Depending upon the substrate to which the composition is being applied, water is the preferred solvent due to environmental concerns.

A fluorochemical treatment composition is preferably used as an aqueous composition, in particular an aqueous dispersion in water. If the fluorochemical oligomer is made by solution polymerization, it can be dispersed in water, through vigorously mixing the solution oligomer with water in the presence of a surfactant or emulsifier. A solvent free dispersion can be obtained by subsequent distillation of the oligomerization solvent.

The amount of the fluorochemical composition (component a) and b)) applied to a substrate in accordance with this invention is chosen so that sufficiently high or desirable water and oil repellencies, and antisoiling properties are imparted to the substrate surface, said amount usually being such that 0.01% to 5% by weight, preferably 0.05 to 2% by weight, of fluorine is present on the treated substrate. The amount which is sufficient to impart desired repellency can be determined empirically and can be increased as necessary or desired.

To prepare the aqueous dispersions, the oligomers, together with cationic or anionic and, if appropriate, non-ionic dispersing and/or emulsifying or surfactant agents and, if appropriate, other auxiliaries and solvents, are vigorously dispersed in water, a relatively large amount of energy being supplied. To facilitate the preparation of the dispersion, the oligomer product may be dissolved first in solvent or mixture of solvents, and the dispersion is advantageously carried out in two separate steps, predispersion being carried out first, followed by fine dispersion. Predispersion can also be carried out by using high shearing forces, for example by using a high-speed stirrer, such as a dispersing machine of the Ultraturax™ type, and the predispersion thereby obtained is then subjected, for example, to ultrasonic treatment or treatment in a high pressure homogenizer. After this treatment, the particle size in the dispersion generally will be equal to or less than 1 μm to the extent of more than 80%, preferably to the extent of more than 95%. Generally, the aqueous dispersion as a concentrate contains 5 to 50% by weight of an active composition (fluorochemical oligomeric component and antisoiling components), 0.5 to 15% by weight of one or more dispersing and/or emulsifying agents, and 0 to 30% by weight of a solvent or solvent mixture, the remainder being water. Conventional cationic, nonionic, anionic, and zwitterionic emulsifiers are suitable. Solventless dispersions can be prepared by removing the solvent by distillation.

Mixtures of water-insoluble solvents with water-soluble solvents can be employed as the solvent for preparation of the dispersion, the amount of the water-insoluble solvent in most cases being greater than the water-soluble solvent. Suitable water-soluble solvents are, for example, mono- or di-alcohols, lower ketones, polyglycol esters, and polyglycol ethers, or mixtures of such solvents. Examples of water-insoluble solvents are esters, ethers, and higher ketones. Low-boiling solvent portions can be removed by, for example, distillation, at a later time, if desired. Preferred water-insoluble solvents are esters or ketones, such as ethyl acetate, butyl acetate, and methyl ethyl ketone.

Another embodiment of the present invention is an article having a cured coating derived from the chemical composition of the present invention and optionally a solvent. After application and curing of the coating composition, the article exhibits durable oil- and water-repellency, and/or stain-release/resistance and antisoiling properties.

The coating compositions of the present invention can be applied to a wide variety of substrates, including, but not limited to, fibrous substrates and hard substrates. Fibrous substrates include woven, knit, and nonwoven fabrics, textiles, carpets, leather, and paper. Hard substrates include, but are not limited to, glass, ceramic, masonry, concrete, natural stone, man-made stone, grout, metals, wood, plastics, and painted surfaces. Substrates can have flat or curved surfaces and may be particulate and fibrous in nature, as well. Preferred substrates are fibrous or are capable of imbibing a liquid and are therefore porous. Such substrates are particularly subject to staining and soiling, but also benefit greatly from the fluorochemical compositions of the present invention because the coating composition can penetrate into the fibrous or porous substrate surface and spread over the internal surfaces of the substrate.

Preferred substrate that can be coated with the coating composition of the present invention are fibrous substrates, such as nonwoven, knits, and woven fabrics, carpet, drapery material, upholstery, clothing and essentially any textile. To impart repellency and/or antisoiling characteristics to a substrate, having one or more surfaces, (a) the coating composition is applied onto one or more surfaces of the substrate and (b) the coating composition is cured (e.g. dried) at ambient temperature or preferably at elevated temperatures. The use of elevated temperatures is particularly advantageous for curing fibrous substrates, since best repellency properties are then achieved. Elevated temperatures of 50 to 150° C. are preferred with 100 to 130° C. more preferred.

The coating compositions comprising the fluorochemical composition can be applied to a treatable substrate by standard methods such as, for example, spraying, padding, foaming, dipping, roll coating, brushing, or exhaustion (optionally followed by the drying of the treated substrate to remove any remaining water or solvent). The treatable substrate can be in the form of molded or blown articles, sheets, fibers (as such or in aggregated form, for example, yarn, toe, web, or roving, or in the form of fabricated textiles such as carpets), woven and nonwoven fabrics, films, etc. When coating flat substrates of appropriate size, knife-coating or bar-coating may be used to ensure uniform coatings of the substrate. If desired, the fluorochemical composition can be co-applied with conventional fiber treating agents, for example, spin finishes or fiber lubricants. Such a topical treatment process can involve the use of the neat fluorochemical composition, without added solvent, and is thus preferred from an environmental perspective over the use of organic solvent solutions of the fluorochemical composition.

Additionally, the compositions of the invention may also comprise stainblocker materials. These materials prolong the useful life of fabrics and textiles by rendering them more resistant to staining by food and other materials. Included among the useful materials are sulfonated aromatic polymers, polymers that are derived from at least one or more (a- and/or b-substituted) acrylic acid monomers, and hydrolyzed copolymers of at least one or more ethylenically unsaturated monomers and maleic anhydride. Also useful as stainblocking materials are blends of at least two or more of these polymers, reaction products of at least two or more of the monomers from which these polymers may be derived, reaction products of at least one or more of the monomers from which the polymers may be derived and at least one or more of the polymers, and materials obtained by polymerizing at least one or more of the monomers in the presence of one or more of the polymers. Stainblocker materials are described in U.S. Pat. No. 5,952,409 (Boardman et al.) incorporated herein by reference.

Additionally, the compositions of the invention may also comprise other fluorinated or non-fluorinated repellent materials, softeners, anti stats, anti dust mite or anti microbial additives.

The coating compositions can be applied in an amount sufficient to achieve the desired repellency properties for a particular application. This amount can be determined empirically and can be adjusted as necessary or desired to achieve the repellency properties without compromising the properties of the treatable substrate.

EXAMPLES

Glossary

| Descriptor | Formula, structure and/or name | Availability |
|---|---|---|
| "BAYGARD SFA" | carpet protector | Bayer, Germany |
| DBTDL | dibutyl tin dilaurate | Sigma-Aldrich, Milwaukee, WI |
| "FC-657" | carpet protector | 3M. St Paul, MN |
| "FC-661" | carpet protector | 3M. St Paul, MN |
| "FC-672" | carpet protector | 3M. St Paul, MN |
| "FC-3615" | carpet protector | 3M. |
| "LAVIRON 118 SK" | cocoyl aminoxide surfactant | Cognis, Germany |
| ME | 2-mercaptoethanol; $HSCH_2CH_2OH$ | Sigma-Aldrich |
| MIBK | Methyl isobutyl ketone; $CH_3C(O)CH_2CH_2(CH_3)_2$ | Sigma-Aldrich |
| N-100 | "DESMODUR N-100"; | Bayer |
| N-3300 | "DESMODUR N-3300"; | Bayer |
| ODI | Octadecylisocyanate; $CH_3(CH_2)_{17}NCO$ | Sigma-Aldrich |
| ODA | octadecylacrylate | Sigma-Aldrich |
| "PM 1650" | carpet protector | 3M |
| "PM 1670" | carpet protector | 3M |
| "SERMUL EA 266" | Sodium isotridecyl 15 (EO) sulfate solution | Sasol, Germany |
| SA | Stearyl alcohol; $CH_3(CH_2)_{17}OH$ | Sigma-Aldrich |
| V-59 | $CH_3CH_2(CN)(CH_3)N\!=\!N(CH_3)(CN)CH_2CH_3$ | Wako Chemicals, Richmond, VA |
| "WITCONATE AOS" | Sodium alpha olefin sulfonate (40%) | Witco, France |
| "ZONYL 9087" | carpet protector | DuPont, Wilmington, DE |

MeFBSEA, $C_4F_9SO_2N(CH_3)CH_2CH_2OC(O)CH=CH_2$, can be prepared as described in WO 01/30873 A1, Example 2, Part A & B.

Test Methods

Spray Application and Curing Procedure

The aqueous solution is applied to the carpet via spraying to about 15–30% by weight wet pickup, using a laboratory-sized spray booth with conveyor belt designed to mimic the application on a large scale commercial spray booth as is conventionally used at carpet mills. The wet sprayed carpet is then dried at 120° C. (248° F.), typically for 10–20 minutes in a forced air oven. The wet pickup is controlled by varying the conveyor belt speed, product concentration of the liquid and spray pressure.

Foam Application and Curing Procedure

This foam applicator uses a laboratory dynamic mixing device manufactured by Hansa GmbH, Germany, and a laboratory foam applicator device manufactured by Mitter GmbH, Germany, to mimic the application on a large scale commercial foam applicator as is conventionally used at carpet mills. The water based solution is foamed onto the carpet with a wet pickup of about 10% by weight. The wet foamed carpet is then dried at 120° C., in a forced air oven, typically for 10 to 20 minutes. The application rate can be controlled by varying the carpet speed, foam output and the product concentration in the foam.

Water Repellency Test—Samples were evaluated for water repellency using 3M Water Repellency Test V for Floorcoverings (February 1994), available from 3M Company. In this test, samples are challenged to penetrations by blends of DI water and isopropyl alcohol (IPA). Each blend is assigned a rating number as shown below:

| Water Repellency Rating Number | Water/IPA Blend (% by volume) |
|---|---|
| 0 | 100% water |
| 1 | 90/10 water/IPA |
| 2 | 80/20 water/IPA |
| 3 | 70/30 water/IPA |
| 4 | 60/40 water/IPA |
| 5 | 50/50 water/IPA |
| 6 | 40/60 water/IPA |
| 7 | 30/70 water/IPA |
| 8 | 20/80 water/IPA |
| 9 | 10/90 water/IPA |
| 10 | 100% IPA |

In running the Water Repellency Test, a test sample is placed on a flat, horizontal surface. Five small drops of water or a water/IPA mixture are gently placed at points at least two inches apart on the sample. If, after observing for ten seconds at a 45° angle, four of the five drops are visible as a sphere or a hemisphere, the test sample is deemed to pass the test. The reported water repellency rating corresponds to the highest numbered water or water/IPA mixture for which the test sample passes the described test.

It is desirable to have a water repellency rating of at least 1, preferably a rating of at least 3.

Oil Repellency Test—Samples were evaluated for oil repellency using 3M Oil Repellency Test III (February 1994), available from 3M Company, St. Paul, Minn. In this test, samples are challenged to penetration by oil or oil mixtures of varying surface tensions. Oils and oil mixtures are given a rating corresponding to the following:

| Oil Repellency Rating Number | Oil Composition |
|---|---|
| 0 | (fails Kaydol ™ mineral oil) |
| 1 | Kaydol ™ mineral oil |
| 1.5 | 85/15 (vol) mineral oil/n-hexadecane |
| 2 | 65/35 (vol) mineral oil/n-hexadecane |
| 3 | n-hexadecane |
| 4 | n-tetradecane |
| 5 | n-dodecane |
| 6 | n-decane |
| 7 | n-octane |
| 8 | n-heptane |

The Oil Repellency Test is run in the same manner as is the Water Repellency Test, with the reported oil repellency rating corresponding to the highest oil or oil mixture for which the test sample passes the test.

It is desirable to have an oil repellency rating of at least 1.5, preferably a rating of at least 3.

"Walk-on" Soiling Test

The relative soiling potential of each treatment was determined by challenging both treated and untreated carpet samples under defined "walk-on" soiling test conditions and comparing the relative soiling levels. The test is conducted by mounting treated and untreated carpet squares (12 in (30.5 cm)×12 in (30.5 cm) samples on particle board, placing the samples on the floor of one of the two chosen commercial locations, and allowing the samples to be soiled by normal foot traffic. The amount of foot traffic in each of these areas is monitored, and the position of each sample within a given location id changed daily using a patters designed to minimize the effects of position and orientation upon soiling.

Following a specific soil challenge period, measured in number of cycles where one cycle equals approximately 10,000 foot-traffics, the treated samples are removed and the amount of soil present on a given sample is determined using colorimetric measurements, making the assumption that the amount of soil on a given sample is directly proportional to the difference in color between the unsoiled sample and the corresponding sample after soiling. The three CIE color coordinates, L*, a* and b*, of the unsoiled and subsequently soiled samples are measured using a Minolta 310 Chroma Meter (available from Minolta, NY, N.Y.) with a D65 illumination source The color difference value, ΔE, is calculated using the following formula:

$$\Delta E = \sqrt{(\Delta L^*)^2 + (\Delta a^*)^2 + (\Delta b^*)^2}$$

where:

ΔL*=L*(soiled)−L*(Unsoiled)

Δa*=a*(soiled)−a*(Unsoiled)

Δb*=b*(soiled)−b*(Unsoiled)

ΔE values calculated from these colorimetric measurements have been shown to be qualitatively in agreement with values from older, visual evaluations such as the soiling tests suggested by AATCC, and have the additional advantage of higher precision, being unaffected by the evaluation environment or subjective operator differences. Final ΔE values for each sample are calculated as an average of between five and seven replicates.

3M Carpet Accelerated Soiling Test I

The purpose of this test is to measure the tendency of carpet to resist dry soil during use. Briefly, a sample of the carpet is put into a cylindrical chamber with steel balls and soil, and tumbled to emulate soiling of carpet. The sample is then removed, excess soil is blown off of the sample carpet, and a comparative visual value is assigned using a standard rating board. A larger value indicates better performance. For more details see the test method as described in 3M Test Methods, 3M Carpet Accelerated Soiling Test I, Dec. 1, 1987 version (available from 3M,St Paul, Minn.).

Carpets used in Testing

Carpet-1: Polyamide 6, level loop carpet material, 300 g/square meter, Associated Weavers, Ronse, Belgium.

Carpet-2: Polyamide 6, high cut pile carpet material, 700 g/square meter, Associated Weavers, Ronse, Belgium.

Carpet-3: Nylon-6 and Nylon-6,6 carpet samples, pretreated with "FC-661" or FC-657", were obtained from Shaw Industries, Dalton Ga., Carpet-4 Polypropylene carpet samples, pretreated with "FC-672", were obtained from Mohawk, Dalton, Ga.

Carpet 5: Polyamide 6,6, velours carpet material, 660 g/square meter, Zuppritz, Germany.

Carpet 6: Polyamide 6 (Zeftron fibre, BASF Germany), level loop carpet material, 720 g/square meter, Fletco Denmark.

Carpet 7: Polyamide 6, level loop carpet material, 790 g/square meter, Fletco Denmark.

Carpet 8: Polypropylene (Aqualis, Italy), level loop carpet material, 610 g/square meter, Fletco Denmark.

Carpet 9: Wool, level loop carpet material, 1050 g/square meter, Fletco Denmark

Carpet 10: Polypropylene (Meraclon, Italy), high cut pile carpet material, 610 g/square meter, Fletco Denmark.

Preparation of EMA/MMA 50/50

A 3 necked round bottom flask equipped with a stirrer, temperature control and nitrogen purge, was charged with methylmethacrylate (70.0 g), ethylmethacrylate (70.0 g), DI water (346 g), and "SERMUL EA 266" ( 23.3 g). The flask was heated to 40° C., purged with nitrogen under stirring, then 1.4 gram potassium persulfate (1.4 g) in DI water (20.0 g) was added. When the temperature of the reaction mixture reached 80° C. a mixture of methylmethacrylate (289.0 g), ethylmethacrylate (289.0 g), "SERMUL EA 266" (96.3 g) and DI Water (323.0 g) was added to the flask over a 2 hour period, while the temperature was kept at 80° C. Next 0.4 g potassium persulfate (0.4 g) in DI water (20.0 g) was added, and the reaction temperature was held for an additional 2 hours at 80° C. The mixture was then cooled to room temperature and filtered through a cheese cloth. The resulting product, EMA/MMA 50/50, was a transparent copolymer dispersion (approximately 50% solids).

Preparation of FCUR-1; (MeFBSEA)$_4$SC$_2$H$_4$OH/N-100/SA; 1/1/1

To a round bottom flask equipped with a stirrer, thermocouple, heating mantle, reflux condenser and nitrogen bubbler was added MeFBSEA (411.0 g; 1.0 mole) and ethyl acetate (143.5 g). The contents of the flask was stirred to form a solution and nitrogen was bubbled through the solution for 15 minutes. To this solution was added ME (19.5 g; 0.25 mole), V-59 (1.0 g) and the resulting solution was heated at 65° C. (150° F.) for about 15 hours. The ensuing solution of oligomer was cooled to 40° C. (105° F.) and SA (67.5 g; 0.25 mole), N-100 (95.5 g.), ethyl acetate (252.2 g.) and DBTDL (10 drops) were added. The ensuing mixture was heated at 75° C. (167° F.) for 10 hours. The solution was then cooled to ambient temperature and ethyl acetate (495.0 g) was added, yielding a solution of (MeFBSEA)$_4$SC$_2$H$_4$OH/N-100/SA; 1/1/1 at 40% by wt. solids. Under vigorous stirring, a mixture of DI water (1384.0 g.) and Sermul EA 266 (138.4 g.) was poured into the flask containing (MeFBSEA)$_4$SC$_2$H$_4$OH/N-100/SA; 1/1/1 at 40% by wt. solids (both materials held at 50° C. (122° F.)). Stirring was continued for about 5 minutes at maximum stirrer speed, to form a pre-emulsion. This pre-emulsion was then passed 2 times through a 2-stage "MANTON GAULIN" high pressure homogenizer (pressure settings 20 and 250 bar) to form a dispersion. The ethyl acetate was distilled off under reduced pressure to obtain a solvent free anionic dispersion (approximately 30% solids).

Preparation of FCUR-2; (MeFBSEA)$_4$SC$_2$H$_4$OH/N-100/SA; 1.5/3/1.5

FCUR-2, MeFBSEA/ME/N-100/SA; 1.5/3/1.5, was prepared essentially following the method described for the Preparation of FCUR-1, substituting appropriate equivalent amount of materials to arrive at the 1.5/3/1.5 ratio of components.

Preparation of FCUR-3; (MeFBSEA)$_4$SC$_2$H$_4$OH/N-100/SA; 2/3/1

FCUR-3, MeFBSEA/ME/N-100/SA; 2/3/1, was prepared essentially following the method described for the Preparation of FCUR-1, substituting appropriate equivalent amount of materials to arrive at the 2/3/1 ratio of components.

Preparation of FCUR-4; (MeFBSEA)$_4$SC$_2$H$_4$OH/N-100/SA; 1/3/2

FCUR-4, MeFBSEA/ME/N-100/SA; 1/3/2, was prepared essentially following the method described for the Preparation of FCUR-1, substituting appropriate equivalent amount of materials to arrive at the 1/3/2 ratio of components.

Preparation of FCUR-5; (MeFBSEA)$_4$SC$_2$H$_4$OH/ODI; 1/1

To a round bottom flask equipped with a stirrer, thermocouple, heating mantle, reflux condenser and nitrogen bubbler was added MeFBSEA (411.0 g; 1.0 mole) and ethyl acetate (143.5 g). The contents of the flask was stirred to form a solution and nitrogen was bubbled through the solution for 15 minutes. To this solution was added ME (19.5 g; 0.25 mole), V-59 (1.0 g) and the resulting solution was heated at 65° C. (1 50° F.) for about 15 hours. The ensuing solution of oligomer was cooled to 40° C. (105° F.) and the solvent was removed using a rotary evaporator. A portion of this crude solid (141.4 g.; 0.0820 mole), MIBK (175 g.) and ODI (24.2 g.; 0.082 moles) were placed in a round bottom flask equipped with a thermocouple, stirrer and nitrogen bubbler. The ensuing mixture was heated at 85° C. (185° F.) for approximately 17 hours. The flask was then cooled to 75° C. (167° F.) and another aliquot of MIBK (50.0 g.) was added.

For treatment on Carpet-3, the above MIBK solution was added while stirring to water (600.0 g) containing 8.25 g of Sodium dodecyl benzene sulfonate (Rhodia Inc. ) at 65° C. Allowed to stir at 65° C. for 1 min. before it was sonicated for 4–5 min. The MIBK was removed under reduced pressure to give a bluish milky emulsion of ca. 30% solids.

For treatment on Carpet-4, the above MIBK solution was added while stirring to water (600.0 g) containing 4.1 g of Sodium dodecyl benzene sulfonate (Rhodia Inc.) and 4.1 g of "TWEEN-80" (available from ICI, UK) at 65° C. Allowed to stir at 65° C. for 1 min. before it was sonicated for 4-5 min. The MIBK was removed under reduced pressure to yield a bluish milky emulsion of ca. 30% solids.

Preparation of FCUR-6: ((MeFBSEA)$_4$SC$_2$H$_4$OH)/SA/N-3300; 2/1/3

FCUR-6 was prepared essentially following the method described for the Preparation of FCUR-1, substituting N-3300 for N-100 and appropriate equivalent amount of other materials to arrive at the 2/1/3 ratio of components Preparation of FCUR-7: ((MeFBSEA)$_4$SC$_2$H$_4$OH)/SA/N-3300; 1.5/1.5/3

FCUR-7 was prepared essentially following the method described for the Preparation of FCUR-1, substituting N-3300 for N-100 and appropriate equivalent amount of other materials to arrive at 1.5/1.5/3 ratio of components Preparation of FCUR-8: ((MeFBSEA)$_4$SC$_2$H$_4$OH)/SA/N-3300; 1/2/3

FCUR-8 was prepared essentially following the method described for the Preparation of FCUR-1, substituting N-3300 for N-100 and appropriate equivalent amount of other materials to arrive at 1/2/3 ratio of components Preparation of FCUR-9 {(MeFBSEA)$_4$(ODA) SCH$_2$CH$_2$OH}/SA/1.0 N-100; 1/1/2

To a round bottom flask equipped with a stirrer, thermocouple, heating mantle, reflux condenser and nitrogen bubbler was added MeFBSEA (411.0 g; 1.0 mole), Octadecylacrylate (81 g, 0.25 mole) and ethyl acetate (170 g). The contents of the flask was stirred to form a solution and nitrogen was bubbled through the solution for 15 minutes. To this solution was added ME (19.5 g; 0.25 mole), V-59 (1.0 g) and the resulting solution was heated at 65° C. (150° F.) for about 15 hours. The ensuing solution of mixed oligomer was cooled to 40° C. (105° F.) and SA (67.5 g; 0.25 mole), N-100 (95.5 g.), ethyl acetate (280 g.) and DBTDL (10 drops) were added. The ensuing mixture was heated at 75° C. (167° F.) for 10 hours. The solution was then cooled to ambient temperature and ethyl acetate (561.8 g) was added, yielding a solution of (MeFBSEA)$_4$(ODA) ISC$_2$H$_4$OH/N-100/SA; 1/1/1 at 40% by wt. solids.

Under vigorous stirring, a mixture of DI water (1574 g.) and Sermul EA 266 (157.4 g.) was poured into the flask containing (MeFBSEA)$_4$(ODA)$_1$SC$_2$H$_4$OH/N-100/SA; 1/1/1 at 40% by wt. solids (both materials held at 50° C. (122° F.)). Stirring was continued for about 5 minutes at maximum stirrer speed, to form a pre-emulsion. This pre-emulsion was then passed 2 times through a 2-stage "MANTON GAULIN" high pressure homogenizer (pressure settings 20 and 250 bar) to form a dispersion. The ethyl acetate was distilled off under reduced pressure to obtain a solvent free anionic dispersion (approximately 30% solids).

TABLE 1

ΔE values for Carpet-3.

| Example | Ratio of FCUR-5:EMA/MMA | ppm | OR (WR) | ΔE |
|---|---|---|---|---|
| 1 | FCUR-5 without EMA/MMA | 300 | 6 (2) | 9.5 |
| 2 | 1:1 | 300 | 6 (2) | 8.4 |
| 3 | 1:2 | 300 | 5 (1) | 8.5 |
| 4 | 1:3 | 300 | 5 (1) | 7.9 |
| 5 | 1:4 | 300 | 4 (1) | 9.2 |
| C-1 | — | — | Fail (Fail) | 10.7 |

TABLE 2

ΔE values for Carpet-3.

| Example | Ratio of FCUR-5:EMA/MMA | Ppm | OR (WR) | ΔE |
|---|---|---|---|---|
| 6 | FCUR-5 without EMA/MMA | 150 | 3 (2) | 10.2 |
| 7 | 1:1 | 150 | 3 (1) | 9.0 |
| 8 | 1:2 | 150 | 3 (1) | 9.7 |
| 9 | 1:1 | 200 | 3 (2) | 8.8 |
| 10 | 1:2 | 200 | 2 (2) | 9.9 |
| C-2 | — | — | Fail (Fail) | 11.6 |

TABLE 3

ΔE values for Carpet-4 at 0.21% SOC

| Example | Ratio of FCUR-5:EMA/MMA 50/50 | Ppm | OR (WR) | ΔE |
|---|---|---|---|---|
| 11 | 1:1 | 564 | 4 (3) | 0.6 |
| 12 | 2:1 | 803 | 4 (3) | 1.1 |
| C-3 | — | 35 | 0 (−1) | 2.2 |

Table 4. Values for oil and water repellency and results of accelerated Carpet test I (ADS) for Carpet-1 and Carpet-2, with FCUR and EMA/MMA 50/50 at percentages listed. Two different carpet styles were spray treated, using Spray Application and Curing Procedure described above, with different fluorochemical compositions. The resulting samples were tested for their oil and water repellency, and their dry soil resistance according to the 3M Carpet Accelerated Soiling Test I (ADS). The spray applications were done with a wet pickup of 30%, and after spraying, the carpet samples were dried in a forced air oven for 15 minutes at 120° C. All Carpet samples were treated in such a way that 0.45% total solids were applied by carpet pile weight.

TABLE 4

| % solids FCUR (% solids EMA/MMA 50/50) | Ex. | OR (WR) | ADS | Ex | OR (WR) | ADS |
|---|---|---|---|---|---|---|
| FCUR-1 @ 0.45 (0) | C-4 | 6 (4) | 3 | C-5 | 1 (2) | 2.5 |
| FCUR-1 @ 0.30 (0.15) | 13 | 5 (4) | 3 | 14 | 1.5 (2) | 2.5 |
| FCUR-1 @ 0.23 (0.23) | 15 | 5 (4) | 3 | 16 | 1.5 (2) | 2 |
| FCUR-1 @ 0.15 (0.30) | 17 | 5 (4) | 3.5 | 18 | 0 (2) | 2.5 |
| FCUR-3 @ 0.45 (0) | C-6 | 6 (6) | 2 | C-7 | 1 (2) | 2 |
| FCUR-3 @ 0.30 (0.15) | 19 | 6 (5) | 2 | 20 | 1 (2) | 2 |
| FCUR-3 @ 0.23 (0.23) | 21 | 6 (5) | 2 | 22 | 1 (2) | 2 |
| FCUR-3 @ 0.15 (0.30) | 23 | 5 (5) | 3 | 24 | 1 (2) | 2 |
| FCUR-4 @ 0.45 (0) | C-8 | 5 (5) | 3 | C-9 | 1 (2) | 2 |
| FCUR-4 @ 0.30 (0.15) | 25 | 5 (4) | 3 | 26 | 1.5 (3) | 2 |
| FCUR-4 @ 0.23 (0.23) | 27 | 4 (4) | 3 | 28 | 1 (2) | 2 |
| FCUR-4 @ 0.15 (0.30) | 29 | 4 (4) | 3 | 30 | 1.5 (3) | 2 |
| treated with FC-3615 | C-10 | 4 (3) | 3 | C-11 | — | — |
| untreated carpet | C-12 | 0 (0) | 1 | — | — | — |

— indicates not measured

Table 5 lists results of 6 different carpets spray treated with different comparative compositions and Blend 1 according to this invention. The treated carpet samples were tested for their oil and water repellency, and their dry soil resistance according to the 3M Carpet Accelerated Soiling Test 1 (ADS). The spray applications were done with a wet pickup of 30%, and after spraying the carpet samples were dried in a forced air oven for 15 minutes at 120° C. In Table 5, the figures under each product represent the 0.45% of product that was applied on carpet pile weight.

TABLE 5

| Ex.  | Carpet    | PM-1670 | FC-672 | Lav118 SK | PM 1650 | Blend 1* | OR  | WR | ADS  |
|------|-----------|---------|--------|-----------|---------|----------|-----|----|------|
| C-13 | Carpet 5  | 0       | 0      | 0         | 1.8     | 0        | 2   | 3  | 3    |
| 31   | Carpet 5  | 0       | 0      | 0         | 0       | 1.8      | 4   | 5  | 3.5  |
| C-14 | Carpet 5  | 1.5     | 0      | 0         | 0       | 0        | 0   | 2  | 3–   |
| C-15 | Carpet 5  | 0       | 0      | 0         | 0       | 0        | 0   | 0  | 2    |
| C-16 | Carpet 6  | 1.5     | 0      | 10        | 0       | 0        | 0   | 1  | 4.25 |
| C-17 | Carpet 6  | 1.5     | 1      | 10        | 0       | 0        | 0   | 1  | 4.25 |
| C-18 | Carpet 6  | 2       | 0      | 10        | 0       | 0        | 0   | 2  | 4.25 |
| C-19 | Carpet 6  | 0       | 0      | 0         | 1.8     | 0        | 5   | 3  | 3.5  |
| 32   | Carpet 6  | 0       | 0      | 0         | 0       | 1.8      | 5   | 5  | 4    |
| C-20 | Carpet 6  | 0       | 0      | 0         | 0       | 0        | 0   | 0  | 2.5  |
| C-21 | Carpet 7  | 1.5     | 0      | 10        | 0       | 0        | 0   | 2  | 4.25 |
| C-22 | Carpet 7  | 1.5     | 1      | 10        | 0       | 0        | 0   | 2  | 4.25 |
| C-23 | Carpet 7  | 0       | 0      | 0         | 1.8     | 0        | 5   | 3  | 4.75 |
| 33   | Carpet 7  | 0       | 0      | 0         | 0       | 1.8      | 5   | 5  | 4.5  |
| C-24 | Carpet 7  | 0       | 0      | 0         | 0       | 0        | 0   | 0  | 3    |
| C-25 | Carpet 8  | 1.5     | 0      | 10        | 0       | 0        | 0   | 1  | 4.25 |
| C-26 | Carpet 8  | 1.5     | 1      | 10        | 0       | 0        | 0   | 2  | 4.5  |
| C-27 | Carpet 8  | 2       | 0      | 10        | 0       | 0        | 0   | 1  | 4.5  |
| C-28 | Carpet 8  | 0       | 0      | 0         | 1.8     | 0        | 0   | 1  | 4.5  |
| 34   | Carpet 8  | 0       | 0      | 0         | 0       | 1.8      | 4–  | 3  | 4.25 |
| C-29 | Carpet 8  | 0       | 0      | 0         | 0       | 0        | 0   | 0  | 3.5  |
| C-30 | Carpet 9  | 1.8     | 0      | 10        | 0       | 0        | 0   | 2  | 4    |
| C-31 | Carpet 9  | 0       | 0      | 0         | 1.8     | 0        | 1.5 | 2  | 4    |
| 35   | Carpet 9  | 0       | 0      | 0         | 0       | 1.8      | 3   | 3  | 4    |
| C-32 | Carpet 9  | 0       | 0      | 0         | 0       | 0        | 0   | 0  | 2.5  |
| C-33 | Carpet 10 | 1.5     | 1      | 10        | 0       | 0        | 0   | 1  | —    |
| C-34 | Carpet 10 | 1.8     | 0      | 10        | 0       | 0        | 0   | 0  | —    |
| C-35 | Carpet 10 | 1.5     | 2      | 10        | 0       | 0        | 0   | 1  | 4.5  |
| C-36 | Carpet 10 | 0       | 0      | 0         | 1.8     | 0        | 0   | 1  | 3.5  |
| 36   | Carpet 10 | 0       | 0      | 0         | 0       | 1.8      | 2   | 2  | 3    |
| C-37 | Carpet 10 | 0       | 0      | 0         | 0       | 0        | 0   | 0  | 2    |

— indicates not measured
*Blend 1: is a mixture of 16% FCUR-1 solids, 8% EMA/MMA 50/50 solids, and 2% Sodium Dioctylsulfosuccinate (Aerosol OT 70 PG, Cytec, West Patterson, USA) solids in water Table 6 lists results for two different carpet styles which were spray treated (30% wet pickup) with different fluorochemical compositions as listed, and tested for their oil and water repellency, and their dry soil resistance according to the 3M Carpet Accelerated Soiling Test I (ADS). All Carpet samples were treated in such a way that 0.45% total solids were applied by carpet pile weight.

TABLE 6

| EMA/MMA | | Carpet-1 | | | Carpet-2 | | |
|---|---|---|---|---|---|---|---|
| 50/50 | Ex | OR | WR | ADS | Ex | OR | WR | ADS |
| FCUR-6 | | | | | | | | |
| 0.30 | 0.15 | 37 | 5 | 6 | 2.5 | 38 | 1 | 2 | 3 |
| 0.23 | 0.23 | 39 | 5 | 5 | 2.5 | 40 | 1 | 2 | 3 |
| 0.15 | 0.30 | 41 | 4 | 5 | 2.25 | 42 | 1 | 2 | 3 |
| FCUR-7 | | | | | | | | |
| 0.30 | 0.15 | 43 | 5 | 5 | 2 | 44 | 1.5 | 2 | 3 |
| 0.23 | 0.23 | 45 | 4+ | 5 | 2.5 | 46 | 1.5 | 2 | 2.75 |
| 0.15 | 0.30 | 47 | 4 | 5 | 2 | 48 | 1.5 | 2 | 3 |

TABLE 6-continued

| EMA/MMA | | Carpet-1 | | | Carpet-2 | | |
|---|---|---|---|---|---|---|---|
| 50/50 | Ex | OR | WR | ADS | Ex | OR | WR | ADS |
| FCUR-8 | | | | | | | | |
| 0.30 | 0.15 | 49 | 5 | 5 | 3 | 50 | 1.5 | 2 | 3.25 |
| 0.23 | 0.23 | 51 | 4+ | 5 | 3 | 52 | 1 | 2 | 2.5 |
| 0.15 | 0.30 | 53 | 4 | 5 | 2 | 54 | 1 | 2 | 3.25 |

Tables 7 & 8 list results for different carpet styles which were spray treated (30% wet pickup) with different fluorochemical compositions as listed, and tested for their oil and water repellency, and their dry soil resistance according to the 3M Carpet Accelerated Soiling Test I (ADS). All Carpet samples were treated in such a way that 0.45% total solids were applied by carpet pile weight.

TABLE 7

| FCUR-9 | EMA/MMA 50/50 | Carpet-1 | | | | Carpet-2 | | | |
|---|---|---|---|---|---|---|---|---|---|
| | | Ex | OR | WR | ADS | Ex | OR | WR | ADS |
| 0.15 | 0.10 | 55 | 5 | 6 | 3 | 56 | 1.5 | 3 | 3.3 |
| 0.13 | 0.13 | 57 | 5 | 6 | 3.5 | 58 | 1 | 2 | 3.3 |
| 0.10 | 0.15 | 59 | 4 | 4 | 3.8 | 60 | 1 | 2 | 3.3 |

TABLE 8

| FCUR-9 | EMA/MMA 50/50 | Carpet-5 | | | | Carpet-6 | | | |
|---|---|---|---|---|---|---|---|---|---|
| | | Ex | OR | WR | ADS | Ex | OR | WR | ADS |
| 0.15 | 0.10 | 61 | 2 | 3 | 4.5 | 62 | 2 | 4 | 4 |
| 0.13 | 0.13 | 63 | 2 | 3 | 4.5 | 64 | 2 | 3 | 4.3 |
| 0.10 | 0.15 | 65 | 2 | 3+ | 4.5 | 66 | 2 | 1 | 4.3 |

Table 9 lists results for different carpet styles which were spray treated (30% wet pickup) with different fluorochemical compositions as listed, and tested for their oil and water repellency, and their dry soil resistance according to the 3M Carpet Accelerated Soiling Test I (ADS). All Carpet samples were treated in such a way that 0.45% total solids were applied by carpet pile weight.

TABLE 9

| FCUR-9 | EMA/MMA 50/50 | Carpet-8 | | | | Carpet-9 | | | | Carpet-10 | | | |
|---|---|---|---|---|---|---|---|---|---|---|---|---|---|
| | | Ex | OR | WR | ADS | Ex | OR | WR | ADS | Ex | OR | WR | ADS |
| 0.15 | 0.10 | 67 | 2 | 3 | 3 | 68 | 1.5 | 2 | 3 | 69 | 1 | 0–1 | 3.5 |
| 0.13 | 0.13 | 70 | 1.5 | 2 | 3 | 71 | 1 | 2 | 4 | 72 | 0 | 0 | 3.8 |
| 0.10 | 0.15 | 73 | 1.5 | 2 | 3 | 74 | 1 | 1 | 4 | 75 | 0 | 0 | 3.8 |

Tables 10 & 11 list results from 5 different carpet styles were foam treated with different comparative carpet protectors and Blend 1. The treated carpet samples were tested for their oil and water repellency, and their dry soil resistance according to the 3M Carpet Accelerated Soiling Test 1 (ADS). The foam applications were done with a wet pickup of 10%, Witconate AOS was used as foaming agent at 10 g/liter bath. After foaming, the carpet samples were dried in a forced air oven for 15 minutes at 120° C. Each product was applied at 1% product on carpet pile weight.

TABLE 10

| | Carpet-5 | | | | Carpet-6 | | | | Carpet-8 | | | |
|---|---|---|---|---|---|---|---|---|---|---|---|---|
| | Ex | OR | WR | ADS | Ex | OR | WR | ADS | Ex | OR | WR | ADS |
| "ZONYL 9087" | C-38 | 2 | 2 | 3 | C-39 | 2 | 2 | 3.75 | C-40 | 1 | 1 | 4.5 |
| "BAYGARD SFA" | C-41 | 0 | 1 | 3 | C-42 | 1 | 1 | 3.75 | C-43 | 1 | 1 | 4.5 |
| Blend-1 | 76 | 2 | 2 | 3 | 77 | 2 | 4 | 4 | 78 | 4 | 3 | 4.5 |
| "PM-1670" | C-44 | 0 | 2 | 3 | C-45 | 0 | 2 | 3.5 | C-46 | 0 | 0 | 4.5 |
| "PM-1650" | C-47 | 1 | 2 | 4 | C-48 | 2 | 3 | 3.75 | C-49 | 0 | 0 | 4 |

TABLE 11

| | Carpet-9 | | | | Carpet-10 | | | |
|---|---|---|---|---|---|---|---|---|
| | Ex | OR | WR | ADS | Ex | OR | WR | ADS |
| "ZONYL 9087" | C-50 | 2 | 1 | 3.5 | C-51 | 0–1 | 0 | 2.5 |
| "BAYGARD SFA" | C-52 | 2 | 1 | 3.25 | C-53 | 0–1 | 0 | 2.5 |
| Blend-1 | 79 | 2 | 3 | 3 | 80 | 2 | 2 | 3.5 |
| "PM-1670" | C-54 | 0 | 0 | 3.5 | C-55 | 0 | 0 | 3 |
| "PM-1650" | C-56 | 0 | 0 | 2 | C-57 | 0 | 0 | 2.5 |

We claim:

1. A composition comprising
   a) a fluorochemical oligomeric compound of the formula:

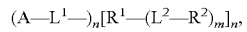

wherein
   A is a fluorochemical oligomeric moiety of the formula

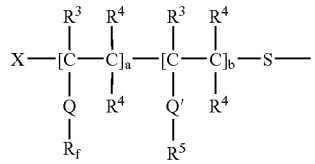

wherein the sum of a+b is a number such that the compound is oligomeric, and a is at least 1;

R³ is hydrogen, halogen, or straight chain or branched chain alkyl containing 1 to about 4 carbon atoms;

each R⁴ is independently hydrogen or straight chain or branched chain alkyl containing 1 to about 4 carbon atoms;

Q and Q' are each independently a covalent bond or an organic linking group,

R_f is a fluoroaliphatic group that comprises a fully fluorinated terminal group;

R⁵ is a fluorine-free aliphatic group;

X is a hydrogen atom or a group derived from a free radical initiator;

L¹ and L² are independently divalent linking groups,

R¹ is the residue of an organic isocyanate,

R² is a hydrogen or an aliphatic group, n is 1 to 4, m is 0 to 4, and p is 1 to 4, wherein at least one of said R² and R⁵ groups has 12 or more carbon atoms; and b) an antisoiling compound.

2. The composition of claim 1 wherein the ratio of a to b of said fluorochemical oligomer a), is at least 2:1.

3. The composition of claim 1, wherein R_f has the structure $C_oF_{2o+1}$, where o is 3 to 7.

4. The composition of claim 1, wherein each of L¹ and L² are derived from the reaction of a nucleophilic group with an isocyanate group.

5. The composition of claim 4 wherein L¹ and L² are independently selected from a ureylene, a urethanylbiuretylene, a guanidinylene and a carbodiimidylene.

6. The composition of claim 1 wherein a+b of said oligomeric moiety is 3 to 20.

7. The composition of claim 1 wherein the ratio of component a) to component b) is 1:20 to 20:1.

8. The composition of claim 1, wherein Q and Q' of said fluorochemical oligomer are independently selected from the following structures, wherein each k is independently an integer from 0 to about 20, R₁' is hydrogen, aryl, or alkyl of 1 to about 4 carbon atoms, and R₂' is alkyl of 1 to about 20 carbon atoms:

| | |
|---|---|
| —SO₂NR₁'(CH₂)_kO(O)C— | —CONR₁'(CH₂)_kO(O)C— |
| —(CH₂)_kO(O)C— | —CH₂CH(OR₂')CH₂O(O)C— |
| —(CH₂)_kC(O)O— | —(CH₂)_kSC(O)— |
| —(CH₂)_kO(CH₂)_kO(O)C— | —(CH₂)_kS(CH₂)_kO(O)C— |
| —(CH₂)_kSO₂(CH₂)_kO(O)C— | —(CH₂)_kS(CH₂)_kOC(O)— |
| —(CH₂)_kSO₂NR₁'(CH₂)_kO(O)C— | —(CH₂)_kSO₂— |
| —SO₂NR₁'(CH₂)_kO— | —SO₂NR₁'(CH₂)_k— |
| —(CH₂)_kO(CH₂)_kC(O)O— | —(CH₂)_kSO₂NR₁'(CH₂)_kC(O)O— |
| —(CH₂)_kSO₂(CH₂)_kC(O)O— | —CONR₁'(CH₂)_kC(O)O— |
| —(CH₂)_kS(CH₂)_kC(O)O— | —CH₂CH(OR₂')CH₂C(O)O— |
| —SO₂NR₁'(CH₂)_kC(O)O— | —(CH₂)_kO— |
| —C_kH_{2k}—OC(O)NH— | —C_kH_{2k}—NR₁'C(O)NH—, |
| —OC(O)NR'(CH₂)_k— | —(CH₂)_kNR₁'— and |
| —(CH₂)_kNR₁'C(O)O—. | |

9. The composition of claim 1 wherein said R² group is an aliphatic group of 12 to 75 carbon atoms.

10. The composition of claim 1 wherein the sum of carbons atoms in said R² and R⁵ groups is 12 to 100.

11. The composition of claim 1 wherein said antisoiling compound is selected from a methacrylic ester polymer, colloidal alumina, colloidal silica, a silsesquioxane, polyvinylpyrrolidone and a water-soluble condensation polymer comprising the reaction product of formaldehyde and an amine.

12. The composition of claim 1 wherein said antisoiling compound comprises a water-insoluble addition polymers derived from a polymerizable ethylenically unsaturated monomer free of non-vinylic fluorine, the polymer having at least one major transition temperature higher than about 25° C.

13. The composition of claim 1, where b of said fluorochemical oligomeric moiety is 0.

14. The composition of claim 1, wherein R¹ is the residue of an aliphatic or aromatic polyisocyanate.

15. The composition of claim 1 wherein the ratio of component a) to component b) is 1:10 to 10:1.

16. The composition of claim 1, wherein said antisoiling (component b)) is selected from the group of (meth)acrylic ester (co)polymers, colloidal alumina, colloidal silica, silsesquioxanes, poly(vinylpyrrolidone) and styrene-maleic anhydride copolymers.

17. The composition of claim 16 wherein said antisoiling agent comprises ethyl methacrylate/methyl methacrylate copolymer.

18. The composition of claim 1, wherein said fluorochemical oligomeric component is the reaction product of
a) a fluorochemical oligomer of the formula

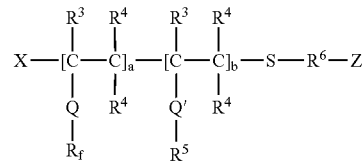

wherein
R⁶ is an aliphatic or aromatic group and Z is an isocyanate-reactive group,
b) a isocyanate of the formula R¹(NCO)_x, wherein x is 1 to 6, wherein R¹ is an aliphatic, alicyclic or aromatic group, and
c) an aliphatic compound of the formula R²—(Z)_q, where R² is a aliphatic group, Z is an isocyanate reactive group and q is 1 to 4.

19. The composition of claim 1, wherein said fluorochemical oligomeric component is the reaction product of
a) a fluorochemical oligomer of the formula

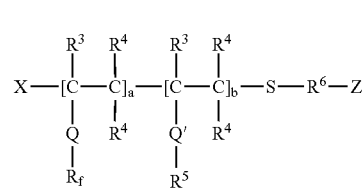

wherein
R⁶ is an aliphatic or aromatic group,
R⁵ is a non-fluorinated aliphatic group of 12 to 75 carbons atoms, and
Z is an isocyanate-reactive group, and
b) an isocyanate of the formula R¹(NCO)_x, wherein x is 1 to 6, wherein R¹ is an aliphatic, alicyclic or aromatic group.

20. A coating composition comprising a mixture of:
a) a solvent; and
b) the composition of claim 1.

21. The coating composition of claim 20 wherein said mixture comprises an aqueous solution, dispersion or suspension.

22. The coating composition of claim 20 further comprising a surfactant.

23. The coating composition of claim 20 comprising 0.1 to 50 weight percent of said composition of claim 1.

24. An article comprising:
   a substrate having one or more surfaces; and
   the fluorochemical composition of claim 1 coated on one or more surfaces of said substrate.

25. The article of claim 24 wherein the substrate is a fibrous substrates.

26. A method of imparting repellency and antisoiling to a substrate, having one or more surfaces, comprising the steps of:
   applying the coating composition of claim 20 onto one or more surfaces of said substrate; and
   curing the coating composition at ambient or elevated temperature.

* * * * *

UNITED STATES PATENT AND TRADEMARK OFFICE
CERTIFICATE OF CORRECTION

PATENT NO. : 7,078,456 B2  
APPLICATION NO. : 10/723510  
DATED : July 18, 2006  
INVENTOR(S) : Chetan P. Jariwala It is certified that error appears in the above-identified patent and that said Letters Patent is hereby corrected as shown below:

Col. 2  
Line 63, delete "filly" and insert -- fully --, therefor.

Col. 7  
Line 59, delete "($H_6$XDD)," and insert -- ($H_6$XDI), --, therefor.  
Line 65, before "1,4" delete "hexaamethylene" and insert -- hexamethylene --, therefor.  
Line 65, after "1,4-diisocyanate," delete "hexaamethylene" and insert -- hexamethylene --, therefor.

Col. 20  
Line 39, delete "(1 50° F.)" and insert -- (150° F.) --, therefor.

Col. 21  
Lines 29-30, delete "(MeFBSEA)$_4$(ODA)IS$C_2H_4$OH/N-100/SA;" and insert -- (MeFBSEA)$_4$(ODA)$_1$S$C_2H_4$OH/N-100/SA; --, therefor.

Col. 26  
Line 24, in Claim 1, delete "(A–$L^1$–)$_n$[$R^1$–($L^2$–$R^2$)$_m$]$_n$," and insert -- (A–$L^1$–)$_n$[$R^1$–($L^2$–$R^2$)$_m$]$_p$, --, therefor.

Col. 28  
Line 38, in Claim 18, delete "aliphatic." and insert -- aliphatic, --, therefor.

Signed and Sealed this

Eighteenth Day of March, 2008

JON W. DUDAS  
*Director of the United States Patent and Trademark Office*